(12) United States Patent
Tashjian (10) Patent No.: US 7,772,504 B1
(45) Date of Patent: Aug. 10, 2010

(54) LAPTOP SHIELD CARRYING CASE AND CELLULAR SHIELD HOLSTER

(76) Inventor: Richard Tashjian, 401 Hasbrouck Blvd., Oradell, NJ (US) 07649

( * ) Notice: Subject to any disclaimer, the term of this patent is extended or adjusted under 35 U.S.C. 154(b) by 141 days.

(21) Appl. No.: 12/211,589

(22) Filed: Sep. 16, 2008

(51) Int. Cl.
*H05K 9/00* (2006.01)
(52) U.S. Cl. .................. 174/380; 174/382; 206/320
(58) Field of Classification Search .............. 206/320; 174/380, 382, 390, 391; 361/816, 818
See application file for complete search history.

(56) References Cited

U.S. PATENT DOCUMENTS

| | | | | | |
|---|---|---|---|---|---|
| 5,124,899 | A | * | 6/1992 | Hale | 362/253 |
| 5,367,309 | A | * | 11/1994 | Tashjian | 343/702 |
| 5,379,893 | A | * | 1/1995 | Ruiz | 206/320 |
| 6,109,434 | A | * | 8/2000 | Howard, Jr. | 206/320 |
| 6,149,001 | A | * | 11/2000 | Akins | 206/320 |
| 6,223,896 | B1 | * | 5/2001 | Bell et al. | 206/320 |
| 6,349,825 | B1 | * | 2/2002 | Swinger et al. | 206/320 |
| 6,494,321 | B1 | * | 12/2002 | Sadow et al. | 206/320 |
| 6,515,223 | B2 | * | 2/2003 | Tashjian | 174/388 |
| 6,763,942 | B1 | * | 7/2004 | Yeh | 206/320 |
| 7,036,642 | B2 | * | 5/2006 | Hoberman et al. | 190/36 |
| 2002/0175099 | A1 | * | 11/2002 | Wu | 206/320 |
| 2004/0134812 | A1 | * | 7/2004 | Yeh | 206/320 |

* cited by examiner

*Primary Examiner*—Hung V Ngo
(74) *Attorney, Agent, or Firm*—Richard A. Joel, Esq.

(57) ABSTRACT

A unique laptop computer or similar device carrying case which can also shield an individual electromagnetic radiation including RF microwave radiation and also heat transfer from the laptop computers when opened or in the closed positions. The invention includes sewn insulating sections along the internal nylon face and an external leather face. A conductive fabric is positioned against the non-conductive plastic sheeting and is rolled up on itself, on four sides, to provide a larger effective virtual shield in the two side insulating sections, each of which includes an inner perforated metal shield and a solid metal shield in the base to protect against electromagnetic radiation. The sections fold inwardly to provide a carrying case held together with four Velcro® strips on the exterior of the case. A Cellular Shield, TCS Holster or other optional accessories can also be stored via the vertical Velcro® accessory strip, located midline on the side of the case, said holster including a neck tube for optional use for storing and protection from the cell phone.

12 Claims, 11 Drawing Sheets

LAPTOP SHIELD CARRYING CASE AND CELLULAR SHIELD HOLSTER

This novel invention relates to laptop computers also known as notebook computers and cellular phones and particularly to a shielding assembly (TCS™) which substantially eliminates the dangers of electromagnetic radiation including but not limited to RF microwave and heat transference emitted from laptop computers and cellular phones. The shielding assembly also serves as a carrying case for the laptop which has the advantage of easy access to the TCS™, TCS Holster™ and optional detachable other items like a pen and pad organizer via a vertical Velcro accessory strip extending midway on its side region.

This invention addresses the concerns over possible health hazards caused by the emission of EMF including but not limited to RF microwave radiation and heat emitted from laptop computers and also the need for mobile accessories supporting laptops. The invention protects the user from such various types of radiation by using particular shielding technologies one of which is disclosed in U.S. Pat. Nos. 6,515,223 and 5,367,309 to Tashjian. In the present invention, the shielding technology is contained within the carrying case for laptops and an associated storage case for cell phones whether carried with a clip or belt loop attached to the case or neck tube.

The prior art discloses a wide variety of carrying cases for laptop computers, however, these existing designs are overly complicated and focus heavily on supporting varying dimensions in laptops, also called notebook computers, and laptop accessories as well. The present invention focuses on shielding the user from harmful EMF including but not limited to RF microwave radiation and heat, while serving at the same time as a simple, lightweight/compact, protective and sturdy case in which the user can carry a laptop. The invention also makes cellular phones more readily and safely available by being able to store the phone on the case with a Velcro® accessory strip when placed in a Cellular Shield or Cellular Shield Holster via the accessory Velcro® strip.

Prior art patents of interest include U.S. Pat. Nos. 7,036,642; 6,349,825; and, 5,124,899.

The invention shields the user from the harmful heat and the EMF including but not limited to RF microwave radiation emitted by the laptops when being used on the user's chest or lap regions and also serves as a lightweight carrying case and base support for the laptop computer. The shielding device folds over itself to form the carrying case and protects the laptop or notebook when stored. The case has open sides and top to facilitate use. With the open top and partially open side regions, cooling is facilitated after the apparatus is turned off or if it is mistakenly turned on.

The product of this invention includes a substantially rectangular main body portion having sewn insulating sections along the internal nylon face thereof and an external sewn face made of leather or similar materials. The main body portion is manufactured using the shielding technology disclosed in U.S. Pat. Nos. 6,515,223 and 5,367,309 to Tashjian. Essentially, the body is rectangular in shape and comprised of conductive fabric centrally positioned against a non-conductive plastic, then rolled up onto itself around for several inches inwardly on all four sides. This allows for a larger functional effective virtual shielding area while having a physically smaller acting/functioning area. This process allows for a minimum of three to five times the functional surface area ratio, (as was also previously stated in applicant's patent '223) increasing the actual shielding effectiveness many fold while physically displaying a smaller more compact working area. The EMF "sees" the shielding area as a larger effective area then it actually is.

A handle is mounted to one edge of the main case body. On larger size cases, handles are mounted on both ends of the main body of the case to fold over against one another or be used as a single handle. Velcro® tabs are mounted on the four corners of the external face of the main body. The main body is flexible in two linear regions allowing three mobile sections only due to the rigidity of the three perforated approximately 1/16" steel-sheeting sections mounted within the casing. The body folds over itself to form a carrying case. The case is secured by fastening Velcro®/leather elastic straps attached with the mounted Velcro® tabs to the Velcro® tabs on the main body. The TCS Holster case may be readily mounted on the external face of the carrying case via a midline vertical accessory Velcro® strip for purposes of carrying a cellular phone in the holster or for storing a Cellular Shield (U.S. Pat. No. 6,515,223), as well as, optional detachable accessories like a pen/pad organizer, et al.

The present invention protects the user from the thermal emissions and EMF including but not limited to RF microwave radiation emitted from a laptop (i.e. WI-FI, wireless, LAN/internet, etc.) when using the apparatus on your lap or chest regions. The user simply disengages the two top and two side fastening straps on the carrying case just on the one side and then opens the carrying case which now becomes a firm/rigid shielding mat/base on which the laptop rests. The four straps can stay attached to the mat on the one side for easier access and reattachment when needed again for reattachment. The shielding mat is also used as a buffer and thermal shield between the user and the laptop. A perforated approximately 1/16" steel sheet is formed in three sections and encased in a six mil plastic sheeting heat sealed casing within the insulation to provide a magnetic shielding component in both the open and closed positions.

Also, due to its unique design, the present invention allows for better and more efficient cooling once the laptop is shutdown or is in a standby mode or even accidentally turned on and placed in the case. This feature can add months or possibly years to the lifespan of a computer. Overheating and slower cooling can accelerate the overall aging process of the internal electrical components of the computer. This process is cumulative particularly if the laptop is accidentally turned on after being stored in the case. One can easily see and hear it turned on while it is stored and protected in the case.

The present invention is available in several predetermined sizes to support larger or smaller laptops. There are generally about four conventional laptop sizes, all of which can be accommodated Accordingly, an object of this invention is to provide a new and improved laptop shield carrying case and an associated cellular shield holster for cell phone storage on ones own person whether used with a headset or just in the standby mode.

Another object of this invention is to provide a uniquely sewn laptop shield which folds into a compact and protective carrying case.

A further object of this invention is to provide a new and improved laptop shield carrying case which includes a main body of conductive fabric centrally positioned against a non-conductive plastic rolled upon on itself on all four sides to provide a larger than actual virtual shield.

A more specific object of this invention is to provide a new and improved laptop shielding carrying case for protecting against heat and EMF radiation wherein the main body includes three steel sheeting sections mounted within plastic casings to shield the laptop magnetically and a virtual elector-shield of conductive fabric and further including Velcro® affixed portions on the external faces for carrying straps and for mounting a cellular shield holster. Also inside the casing is a micro-bubble type plastic foam sheathing for the thermal shielding component, as well as, protection against shock/external vibrations.

The above and other objects and advantages of the present invention may be more clearly seen when viewed in conjunction with the accompanying drawings wherein:

FIG. 1a is a front view of the laptop shield carrying case while

FIG. 5a is a front view of the TCS holster with portions shown in phantom while

FIG. 6a is a front view of the magnetic component shielding in the laptop shield case in an open position while

FIG. 8a shows a front view of the neck tube for a hanging TCS holster while

The invention relates to laptop computers 8 and particularly to a shielding carrying case assembly 9 that substantially eliminates the dangers of EMFs including but not limited to RF microwave radiation and heat emitted from the laptop 8. The shielding assembly 9 folds into a carrying case type configuration for the laptop 8 and is also able to support The Cellular Shield (TCS) and The Cellular Shield (TCS) Holster 50 by means of a Velcro® accessory strip 53 mounted vertically on the exterior midline of the case. Additional optional accessories can also attach/detach to this Velcro strip (i.e. a pen and pad organizer).

Figure 1A:
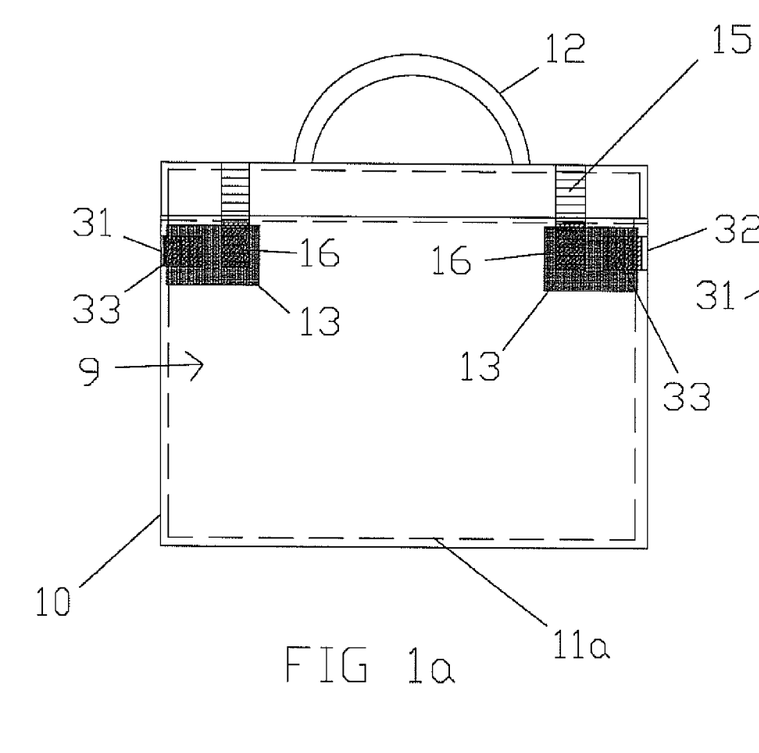
Figure 1B:
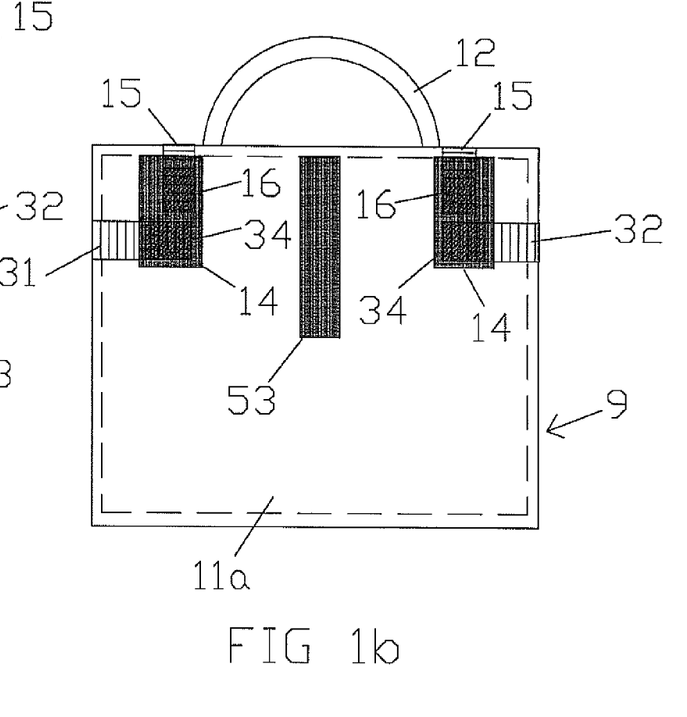
FIG. 1b is a rear view of the laptop shield carrying case.

Referring now to the drawings, FIGS. 1a, 1b disclose a front and a rear view of the carrying case 9 of the present invention. The invention includes a main body 10 having an external face 11a made of a leather or equivalent material preferably in a plurality of sewn sections. A handle 12 is mounted to the top edge of the main body 10 and to the other edge as well on larger sizes. Two substantially rectangular hook and loop pads 13 are mounted horizontally adjacent the two top corners of the external face 11a. Two substantially rectangular hook and loop pads 14 are mounted vertically at the upper rear two corners of the external face 11a. FIGS. 1a and 1b also disclose substantially rectangular straps 15 with mating fastening elements 16 that can attach to the hook and loop pads 13 and 14 and contain the laptop 8 within the case 9. Side straps 31 and 32 include fasteners 33 and 34 which engage pads 13 and 14 to secure the sides of the case 8.

Figure 2:
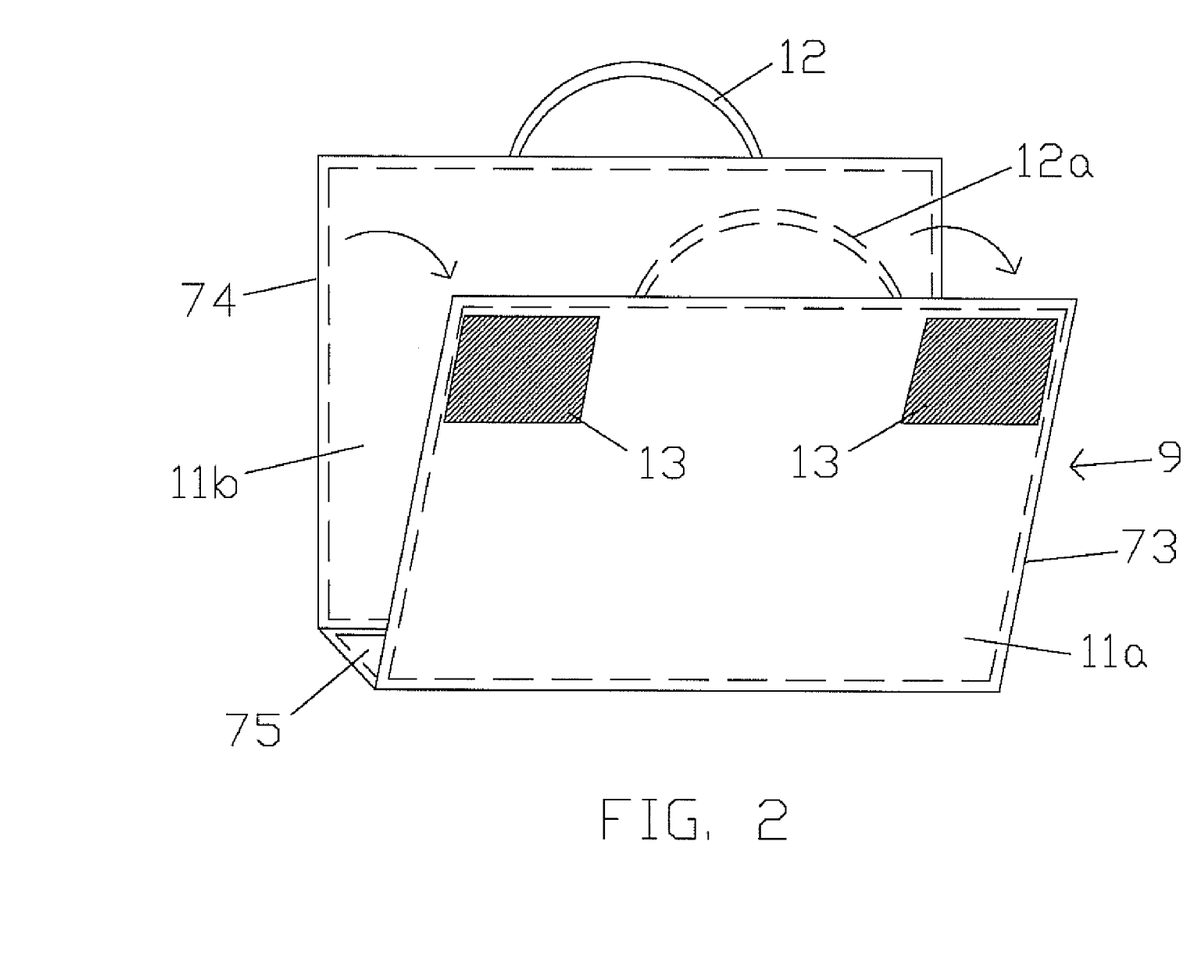
FIG. 2 is a perspective view of the subject carrying case in an opening movement.

FIG. 2 shows the case 9 in a semi-open position without the straps 15, 16, 31, 32. A second strap handle 12a is shown in phantom on the other side of the case 9 in the event larger size computers are being carried.

Figure 3:
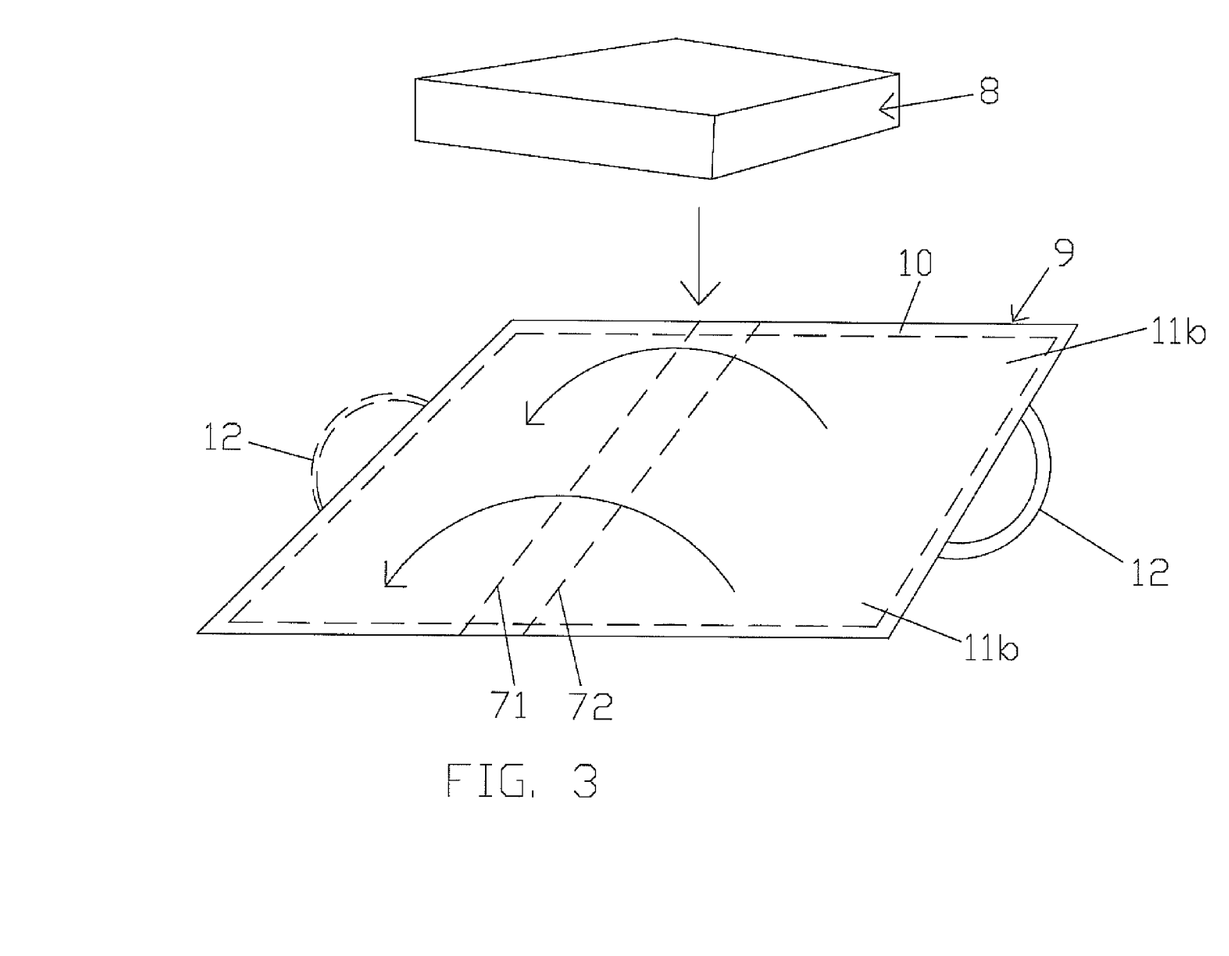
FIG. 3 is a perspective view of the carrying case fully opened for shielding.

FIG. 3 discloses the internal face 11b of the case 9 in a fully-open position for shielding a laptop computer 8 ready for loading in the case 9. The main body 10 is folded along the lines 71, 72 to form the two sides 73 and 74 and the base 75.

Figure 4:
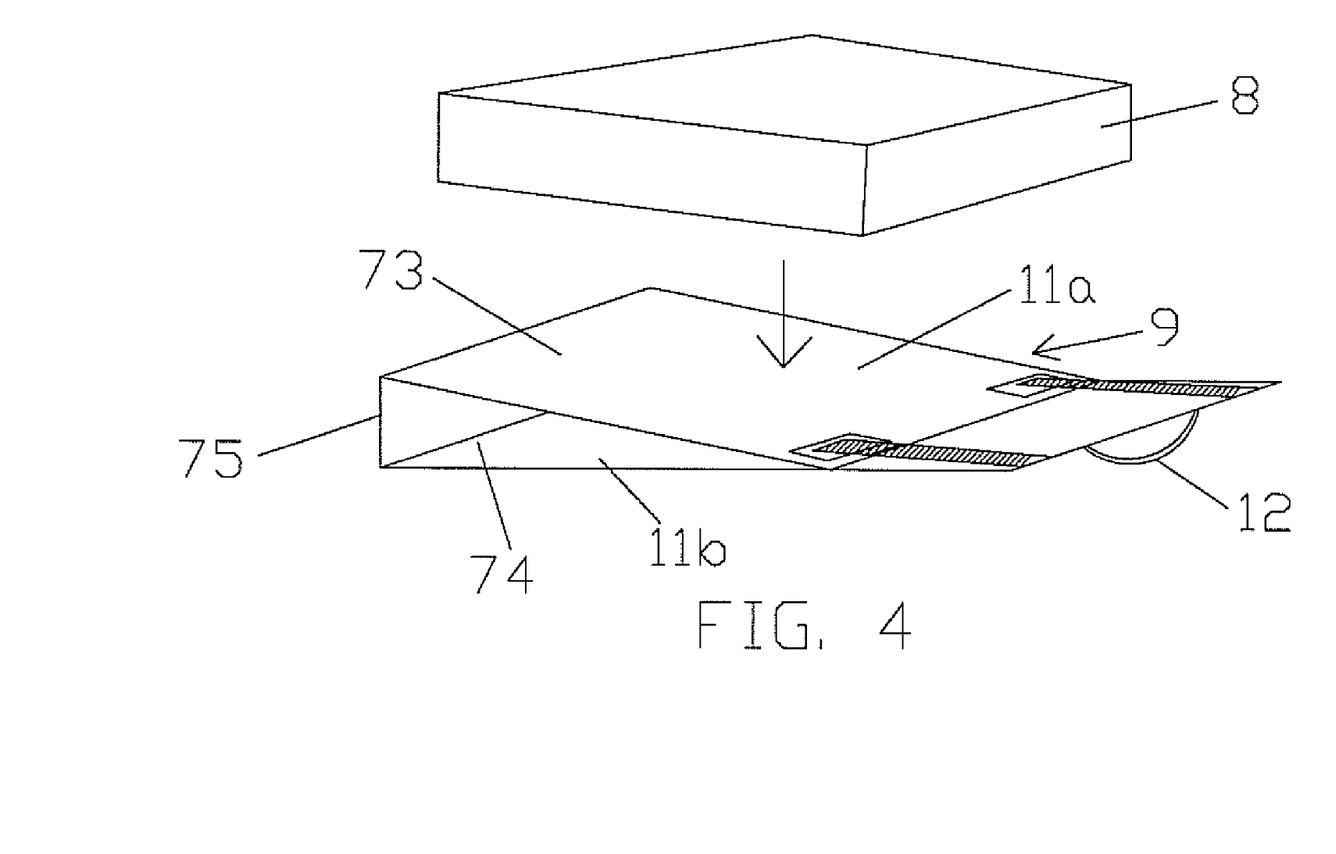
FIG. 4 is a perspective view of the carrying case in a closed position for shielding with a slight forward incline upon which the laptop rests.

FIG. 4 discloses the laptop shield case 9 in a closed position for shielding. The vertical bottom 75 provides a 12°-15° incline to the front side 73 upon which the computer 8 rests. This slight forward incline helps to prevent carpal tunnel syndrome and/or general wrist fatigue symptoms when using the laptop 8 on the closed case 9. The case shield 9 protects the user's body from EMF's and thermal components emitted by the computer particularly when the computer is on one's lap or chest regions.

Figure 5A:
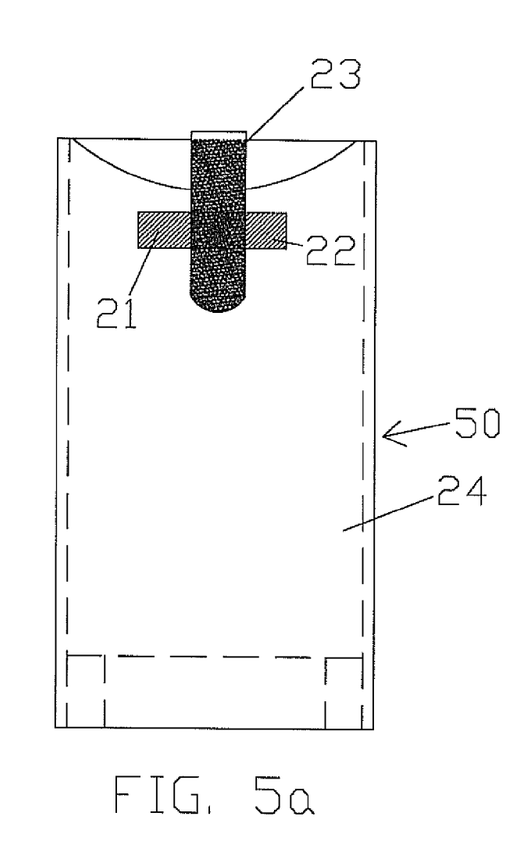
Figure 5B:
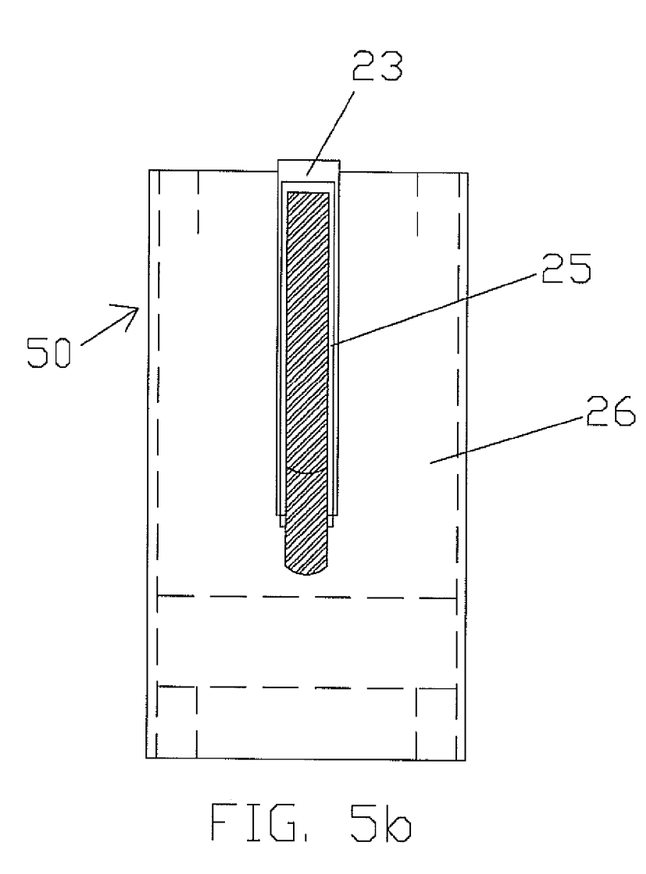
FIG. 5b is a rear view of the TCS holster with portions shown in phantom.

FIGS. 5a and 5b disclose respectively the front and rear faces of the TCS holster 50. The front view of FIG. 5a shows a Velcro® loop tab 21 on the front holster face 22 which is engaged by a Velcro® holding strap 23. The holster 50 includes an inner shield portion, see FIG. 7 (as also used in the previous invention in U.S. Pat. No. 6,51 5,223) and an outer nylon portion 24. A removable metal clip or Velcro® loop 25 is mounted on the rear holster face 26.

Figure 6A:
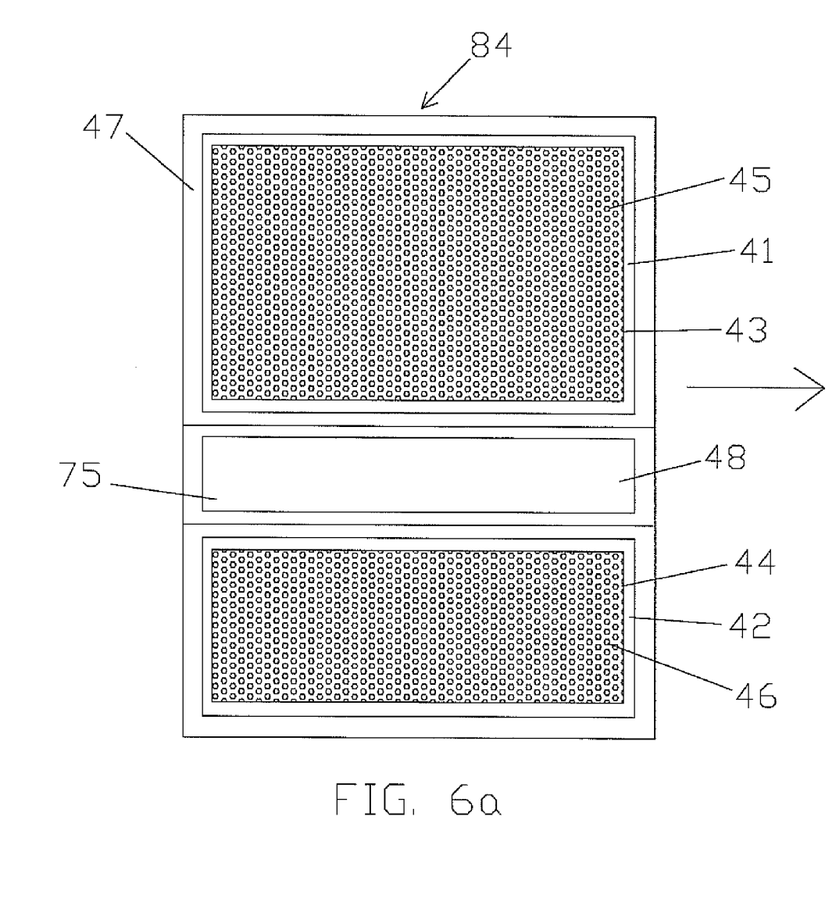
Figure 6B:
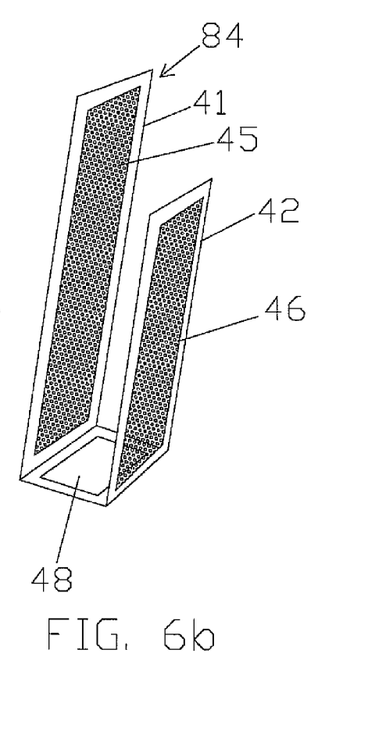
FIG. 6b is a smaller perspective view of the shielding in a closed or folded position.

FIGS. 6a and 6b disclose the magnetic shielding component 40 which protects the user and comprises $\frac{1}{16}$ inch solid steel plating strips 41 and 42 that may be tack welded along all the edges 43 and 44 to perforated steel shielding plates 45 and 46 or initially manufactured that way, when made in larger quantities, all in one single piece of perforated sheet metal sections with an approximately half inch smooth border (no perforations) all the way around the centralized perforations. The shielding component 40 is mounted to an internal 6 mil plastic sheeting 47 in the carrying case 9. The base 75 of the case 9 has an approximately $\frac{1}{16}$ inch solid or perforated steel plate 48 mounted thereto. FIG. 6b shows the shielding component 40 in a folded position.

Figure 7A:
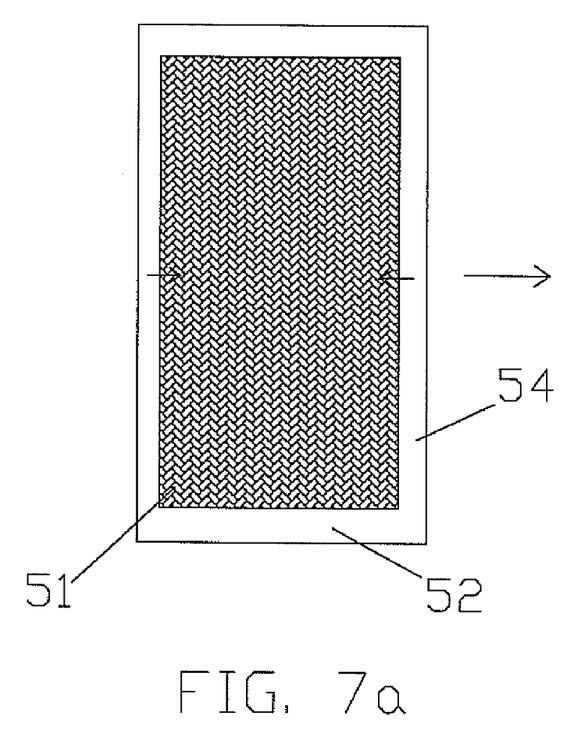
FIG. 7a is a front view showing the electric component shielding in the carrying case and its formation in FIGS. 7b and 7c.
Figure 7B:
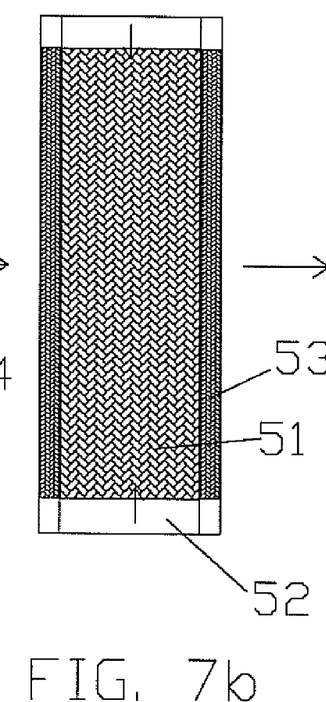
Figure 7C:
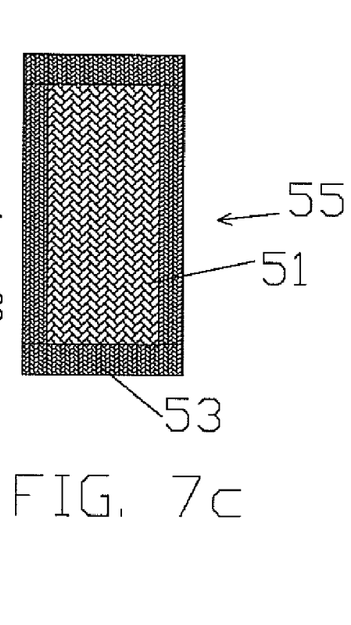

FIG. 7a-c shows the electro-component shielding used in the case 9 and holster 50. Conductive fabric 51 is mounted on plastic (non-conductive) sheeting 52 which is folded inwardly and permanently affixed with tape 53 around the edges 54 lengthwise as shown in FIG. 7b and then folded over to form the finished shield 53 as shown in FIG. 7c. This creates a larger enhanced virtual EMF shield, in a physically smaller area.

This shielding assembly, once completely rolled up/formed, may be even one step further efficiently formed by wrapping or bending the two sides and bottom rolled edges around at 90°, fitted inside TCS Holster casing along the inside of its both sides and bottom regions. This additional step would allow for an even smaller, more compact, AP (Antero-Posterior) portrait/view while still maintaining its overall shielding effectiveness/performance.

Figure 8A:
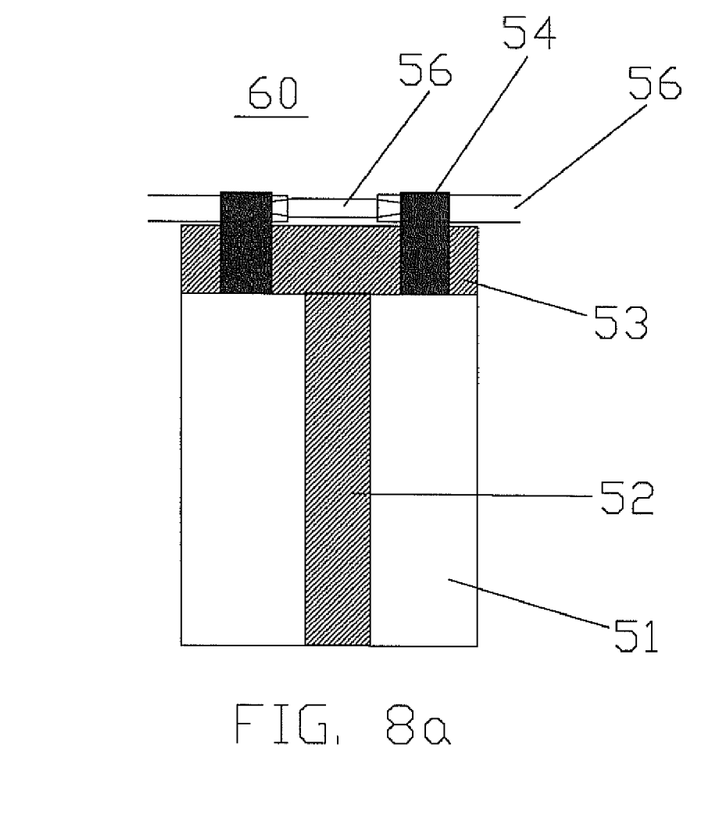
Figure 8B:
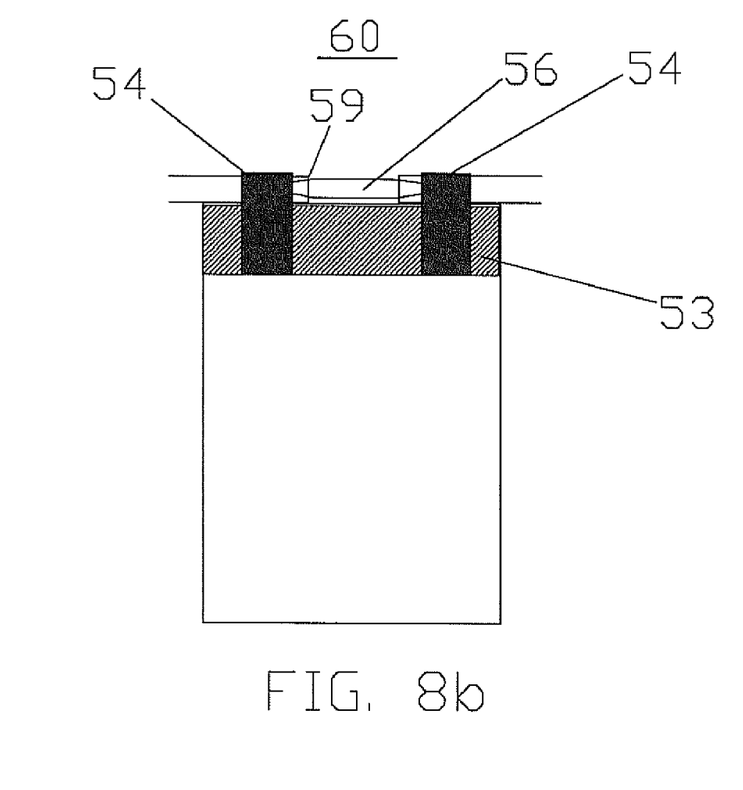
FIG. 8b is a rear view thereof.

FIGS. 8a and 8b depict the front and rear view of a neck tube 60 for hanging a TCS holster 50 around the user's neck. The thin plastic backing 51 includes an intermediate vertical Velcro® loop strip 52 and a horizontal loop strip 53 along the upper portion of the plastic backing 51. The vertical strip 52 is engaged by a Velcro® hook strip (not shown) on the holster 50 while the hook straps 54 engage the strip 53 and hold the clear vinyl tubing 55 in place. A tapered wooden dowel 56 engages the openings 59 in the tubes 57 to secure the tube 60 in place. This tubing can also be used as a conduit for a headset wire or even just acoustical audio alone, transmitting it inside itself from the cell phone up to the ear region.

Figure 9:
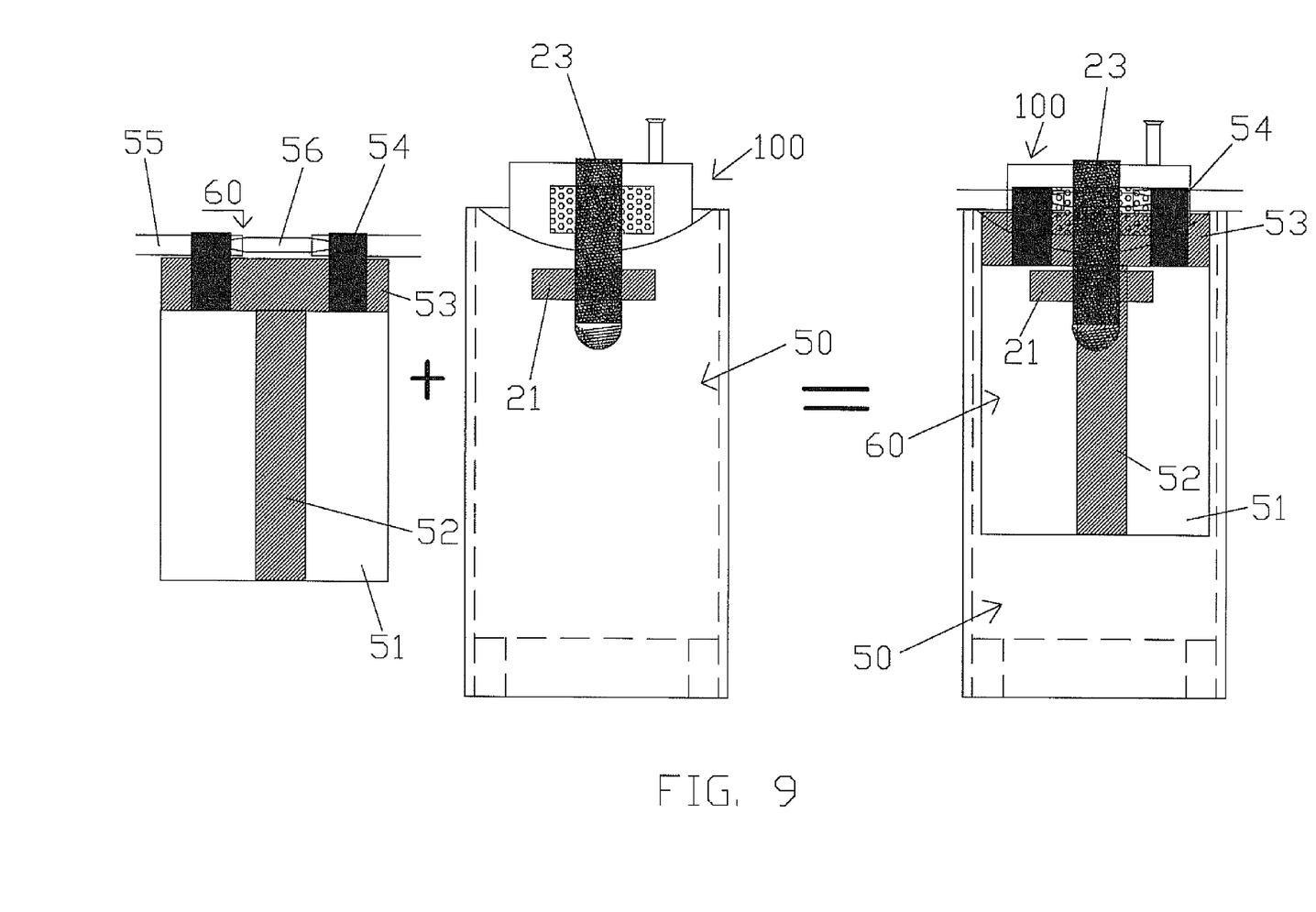
FIG. 9 shows is a front view which the assembly of the neck tube to the TCS holster.

FIG. 9 shows the neck tube assembly 60 and holster 50 assembled together in the holster 50. The strap 54 on the holster 50 engages the Velcro® strip 52 to hold the parts together as shown in the drawings. The tube 60 does not twist and maintains the protective portion of the holster 50 against the user. This accessory allows the present invention to be used in conjunction with the invention disclosed with the invention disclosed in U.S. Pat. No. 6,515,223

The present invention can be manufactured in different sizes. The carrying case can come in a compact size, approximately 12"×14", used for laptops up to 8"×11" in size. The invention can also come in small size, approximately 14"×16", used for laptops up to 10"×13" in size. The invention can come in standard size, approximately 15"×18", used for laptops up to 12"×15" in size. And the invention can come in large size, approximately 18"×20", used for laptops up to 14"×17" in size which will require two handles 12.

Figure 10:
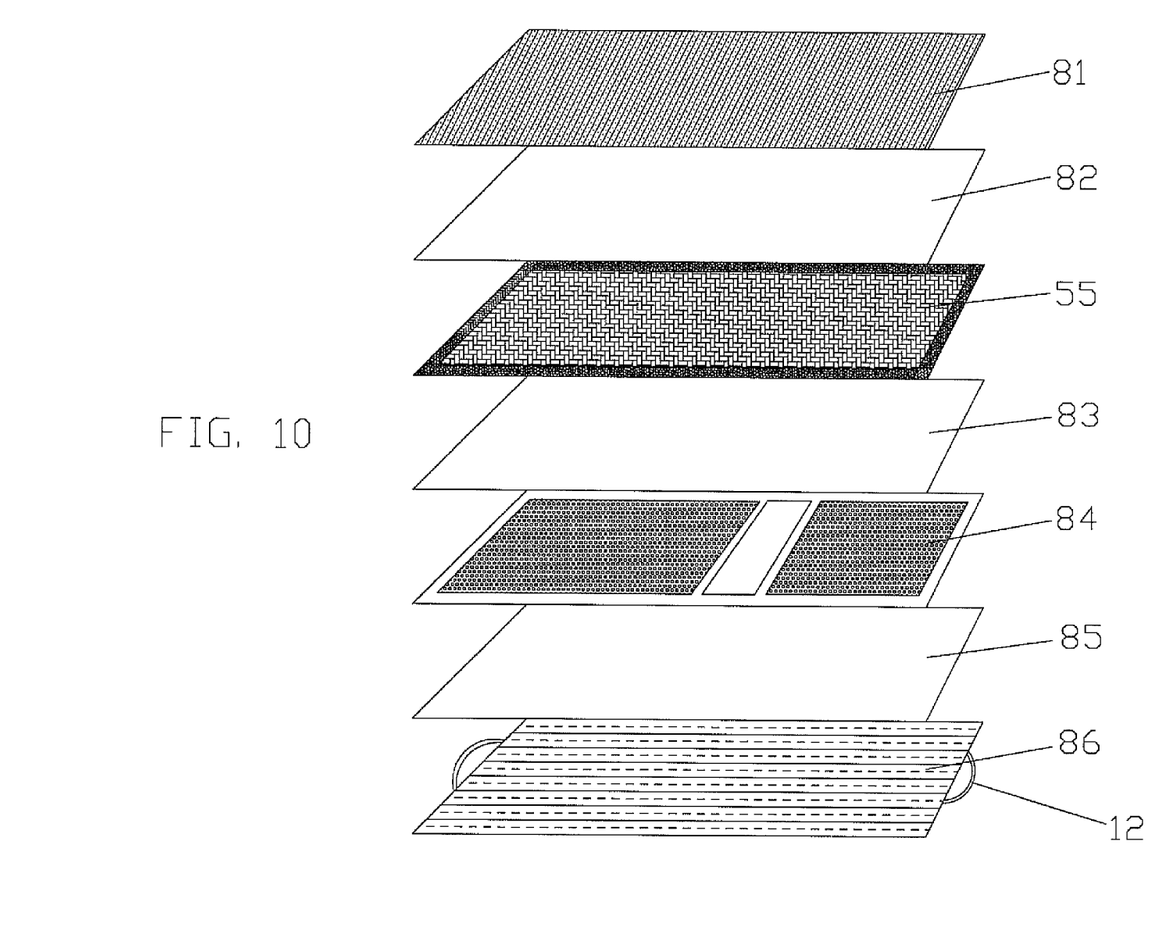
FIG. 10 is a perspective view of the laptop shield layered components.

FIG. 10 shows the layered components used in the laptop shield 60. The shield 9 comprises respectively an inner layer of sports nylon 81, ⅛ inch polystyrene layer 82, an electric shielding layer 55, a second ⅛ inch polystyrene layer 83, magnetic shielding 84 as shown in FIGS. 6a, 6b, a third layer of plastic polystyrene 85 and a leather outer layer 86.

Figure 11:
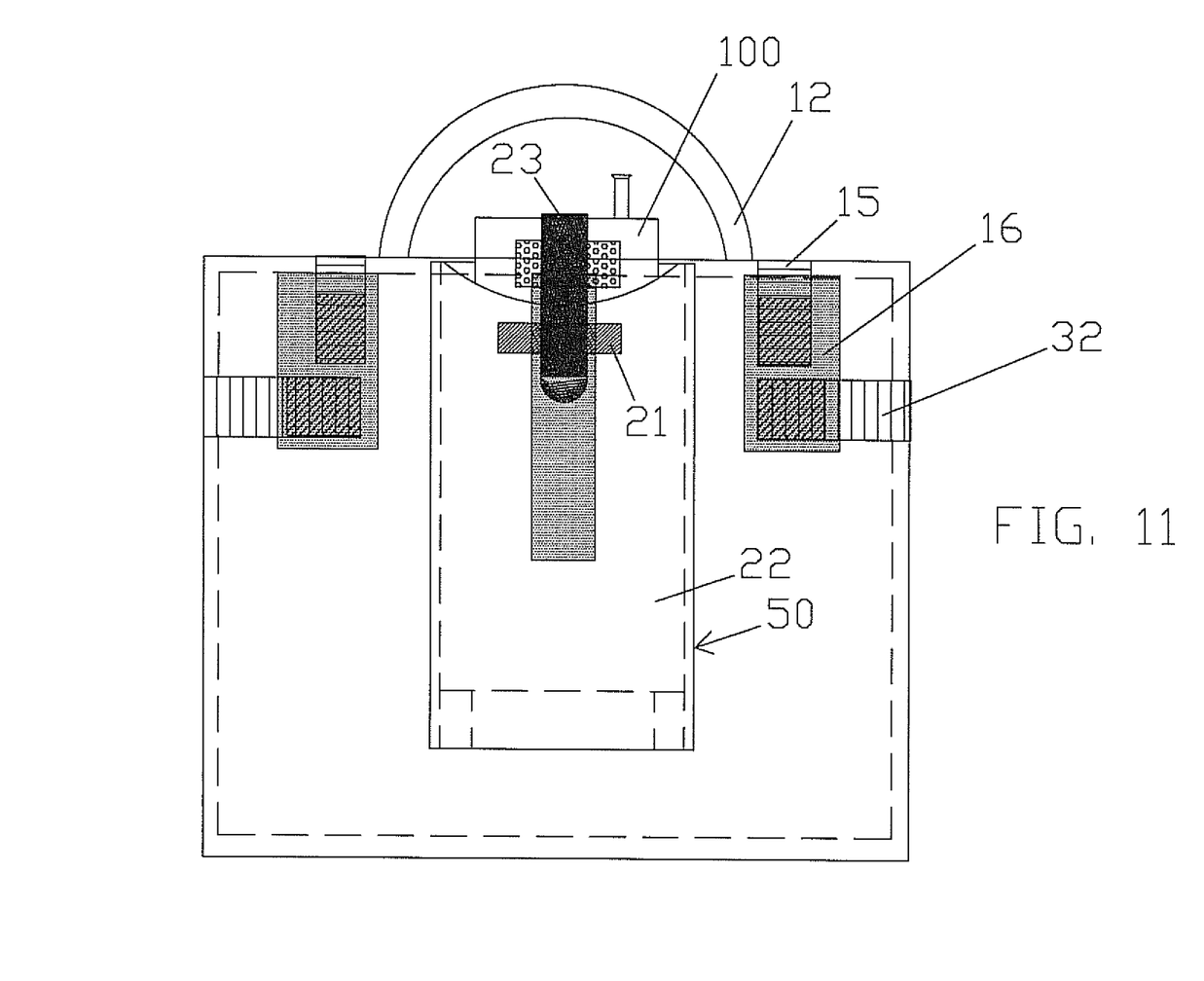
FIG. 11 is a front view of the laptop shield with TCS holster attached

FIG. 11 shows the laptop carrying case 9 with TCS holster 50 and cellular phone 100 attached thereto. The carrying case 9 shields the user from the RF microwave, EMF radiation (including the RF microwave component) and heat (also a hazardous thermal component) when in an open position as disclosed in U.S. Pat. Nos. 6,515,223 and 5,367,309, while the holster 50 shields the user from cell phone radiation.

While the invention has been explained by a detailed description of certain specific embodiments, it is understood that various modifications and substitutions can be made in any of them within the scope of appended claims, which are intended also to include equivalents of such embodiments.

What is claimed is:

1. A laptop shielding carrying case and cellular shield holster comprising:
   a base and a first and second side having inner and outer faces connected to said base and extending upwardly therefrom to form a laptop case;
   a four sided rectangular conductive fabric and a non-conductive plastic casing positioned against said fabric and rolled upon on itself inwardly on all four sides to provide a larger effective electric shield in a compact space said shield being attached to the first and second sides;
   a perforated steel sheet layer mounted adjacent the fabric shield for magnetic shielding;
   an outer leather layer located on the outer face of the first and second sides and the base;
   a thin micro-bubble plastic foam sheathing material for thermal absorption and external shock/vibrations mounted to said faces;
   hook and loop fasteners mounted to the outer leather layer to form an envelope for a laptop; and,
   a strap mounted to at least one side of the case to provide a carrying handle.

2. A laptop shield carrying case cellular shield holster in accordance with claim 1 wherein:
   the outer leather layer and the inner layer are sewed together in a plurality of quilt like rectangles.

3. A laptop shield carrying case cellular shield holster in accordance with claim 2 further including:
   a hook and loop strap on the outer leather face; and,
   a cell phone holster mounted thereto with a mating hook and loop strap.

4. A laptop shield carrying case cellular shield holster in accordance with claim 3 wherein:
   the cell phone holster comprises a shaped fabric and non-conductive plastic rolled over on itself and sewn together to form a receptacle for a cell phone providing a larger effective shielding area.

5. A laptop shield carrying case cellular shield holster in accordance with claim 1 further including:
   a neck tube comprising a hollow cylinder which does not twist, mounted to the holster to optionally permit carrying the holster around one's neck.

6. A laptop shield carrying case cellular shield holster comprising:
   a substantially rectangular plastic sheet having interior and exterior faces said faces being foldable transversely to form a base and opposite sides;
   a leather layer mounted on the exterior face thereof and at least one shielding layer mounted on the interior surface; and
   wherein said exterior and interior surfaces each includes an upper portions and hook and loop pads mounted adjacent said upper portion, further including a plurality of hook and loop straps which hold the exterior and interior surfaces together to form an envelope for a computer and a handle mounted to the upper portion of at least one face for carrying the case.

7. A laptop shield carrying case cellular shield holster in accordance with claim 6 wherein:
   the carrying case may be positioned in a closed position wherein one side is substantially horizontal and the other side is sloped at an angle of approximately 12-15° to provide a forward incline for a computer and lessen fatigue.

8. A laptop shield carrying case cellular shield holster in accordance with claim 6 wherein:
   the shielding layers comprise in order a first layer of plastic Styrofoam affixed to the leather exterior layer, a magnetic shielding layer affixed to the first Styrofoam layer, a second Styrofoam layer positioned against the magnetic shielding layer, an electric shielding layer positioned against the second Styrofoam layer, a third Styrofoam layer positioned against the electric shielding layer and an inner nylon layer.

9. A laptop shield carrying case cellular shield holster in accordance with claim 8 wherein:
   the Styrofoam layers each comprise a ⅛ inch thick plastic Styrofoam layer.

10. A laptop shield carrying case cellular shield holster in accordance with claim 8 wherein:
    the magnetic shielding comprises a first sheet of approximately 1/16 inch perforated steel plating, an intermediate approximately 1/16 inch solid steel plating sheet mounted against the base and a second sheet of 1/16 inch perforated steel plating, said sheets being mounted within a plastic sheet and serving as a shielding layer within the case.

11. A laptop shield carrying case cellular shield holster in accordance with claim 6 wherein:
    the solid steel plate is located in the base of the carry case.

12. A laptop shield carrying case cellular shield holster in accordance with claim 6 wherein:
    the electric shielding layer comprises substantially rectangular plastic sheeting having upper and lower sides;
    a conductive fabric mounted within the plastic sheeting and rolled inwardly on both lower sides and affixed in position and wherein the upper sides are rolled downwardly and affixed in position so that a larger virtual (more effective) shield is provided in a physically smaller space.

* * * * *